(12) United States Patent
Caramico

(10) Patent No.: US 10,586,315 B2
(45) Date of Patent: Mar. 10, 2020

(54) METHOD AND SYSTEM OF REDUCING BLOCK BOUNDARY ARTIFACTS IN DIGITAL IMAGE PROCESSING

(71) Applicant: Luigi Caramico, Foster City, CA (US)

(72) Inventor: Luigi Caramico, Foster City, CA (US)

( * ) Notice: Subject to any disclaimer, the term of this patent is extended or adjusted under 35 U.S.C. 154(b) by 115 days.

(21) Appl. No.: 15/787,692

(22) Filed: Oct. 18, 2017

(65) Prior Publication Data

US 2018/0293718 A1 Oct. 11, 2018

Related U.S. Application Data

(60) Provisional application No. 62/409,852, filed on Oct. 18, 2016.

(51) Int. Cl.

| | |
|---|---|
| G06K 9/40 | (2006.01) |
| G06T 5/50 | (2006.01) |
| G06T 5/30 | (2006.01) |
| G06T 9/00 | (2006.01) |
| H04N 19/86 | (2014.01) |
| H04N 19/88 | (2014.01) |

(52) U.S. Cl.
CPC ............... *G06T 5/50* (2013.01); *G06T 5/30* (2013.01); *G06T 9/00* (2013.01); *H04N 19/865* (2014.11); *H04N 19/88* (2014.11); *G06T 2210/12* (2013.01)

(58) Field of Classification Search
CPC ..... G06T 5/50; G06T 9/00; G06T 5/30; G06T 2210/12; H04N 19/865; H04N 19/88
USPC .......................................................... 382/275
See application file for complete search history.

(56) References Cited

U.S. PATENT DOCUMENTS

| | | | |
|---|---|---|---|
| 8,189,781 B1 * | 5/2012 | Hartman ............... G09C 5/00 | 380/210 |
| 2016/0057380 A1 * | 2/2016 | Liu ....................... H04N 5/913 | 386/254 |

\* cited by examiner

*Primary Examiner* — Andrew M Moyer

(57) ABSTRACT

In one aspect, a computerized method includes the step of obtaining an original digital image to scrambled. The computerized method includes the step of creating a copy of the digital image. The computerized method includes the step of delineating a first pixel-box grid on the digital image. The computerized method includes the step of delineate a second pixel-box grid on the copy of the digital image. The computerized method includes the step of joining the original digital image and the copy of the digital image. The he first pixel-box grid of the original digital image and of the second pixel-box grid are offset by a specified number of pixels; and scrambling the first pixel-box grid of the original digital image and of the second pixel-box grid of the copy of the digital image into an encoded digital image.

12 Claims, 7 Drawing Sheets

METHOD AND SYSTEM OF REDUCING BLOCK BOUNDARY ARTIFACTS IN DIGITAL IMAGE PROCESSING

This application claims priority to U.S. Provisional Application No. 62/409,852 filed on Oct. 18, 2016 and titled METHOD AND SYSTEM OF REDUCING BLOCK BOUNDARY ARTIFACTS IN DIGITAL IMAGE PROCESSING. These applications are incorporated by reference in their entirety.

BACKGROUND

1. Field

This application relates to, digital image processing and more specifically to a system, article of manufacture and method for reducing block boundary artifacts in digital image processing.

2. Related Art

A digital image can be scrambled. The scrambled image can then be further manipulated (e.g., encoded, compressed, etc.). When the image is later descrambled, block artifacts can have been introduced to the image. FIG. 1 illustrates an example of a digital image with block artifacts. If image wasn't scrambled, this information that may be lost in a correct order and the grid effect of the block artifacts may not be present.

SUMMARY

In one aspect, a computerized method includes the step of obtaining an original digital image to scrambled. The computerized method includes the step of creating a copy of the digital image. The computerized method includes the step of delineating a first pixel-box grid on the digital image. The computerized method includes the step of delineate a second pixel-box grid on the copy of the digital image. The computerized method includes the step of joining the original digital image and the copy of the digital image. The he first pixel-box grid of the original digital image and of the second pixel-box grid are offset by a specified number of pixels; and scrambling the first pixel-box grid of the original digital image and of the second pixel-box grid of the copy of the digital image into an encoded digital image.

Figure 1:
FIG. 1 illustrates an example of a digital image with block artifacts, according to some embodiments.

The Figures described above are a representative set, and are not an exhaustive with respect to embodying the invention.

DESCRIPTION

Disclosed are a system, method, and article of manufacture for methods and systems for reducing block boundary artifacts in digital image processing. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method indeed some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definition

Channel can be a grayscale image of the same size as age, but made of just one primary color. For instance, an image from a standard digital camera will have a red, green and blue channel.

Compression artifact is a noticeable distortion of media caused by the application of lossy data compression.

A box (e.g. a pixel box) can be a set of n×n pixels of a digital image. Boxes can be scrambled and/or otherwise reordered to encode the digital image.

Example Methods

In one example embodiment, a digital image can be scrambled and/or otherwise encoded before it becomes publicly accessible. The digital image can be doubled to create two copies. A first copy of the digital image can be divided into a grid of uniform boxes of a specified pixel size. This grid can then be offset (e.g. by half the box size of the first copy of the digital image, etc.) for the second copy of the digital image. The boxes can then be used as units for scrambling the two copies of the digital together.

When the scrambled digital image is descrambled, a boundary artifact can be detected in the grid boundaries of the first copy of the digital image. The boundary artifact can be the result of a loss of information at the boundaries of the boxes during a lossy compression and/or other digital image manipulation processes that occurs while the digital image is in a scrambled state. The boundary artifact can be reduced by sampling the middle/center rows and/or columns of the boxes of the offset grid of the second copy of the digital image. These non-boundary center rows and/or columns can then be substituted for the grid boundaries of the first copy. In this way, given a box size of ten by ten (10×10) pixels, a border error of forty (40) pixels can be reduced to four (pixels), for example.

Figure 2:
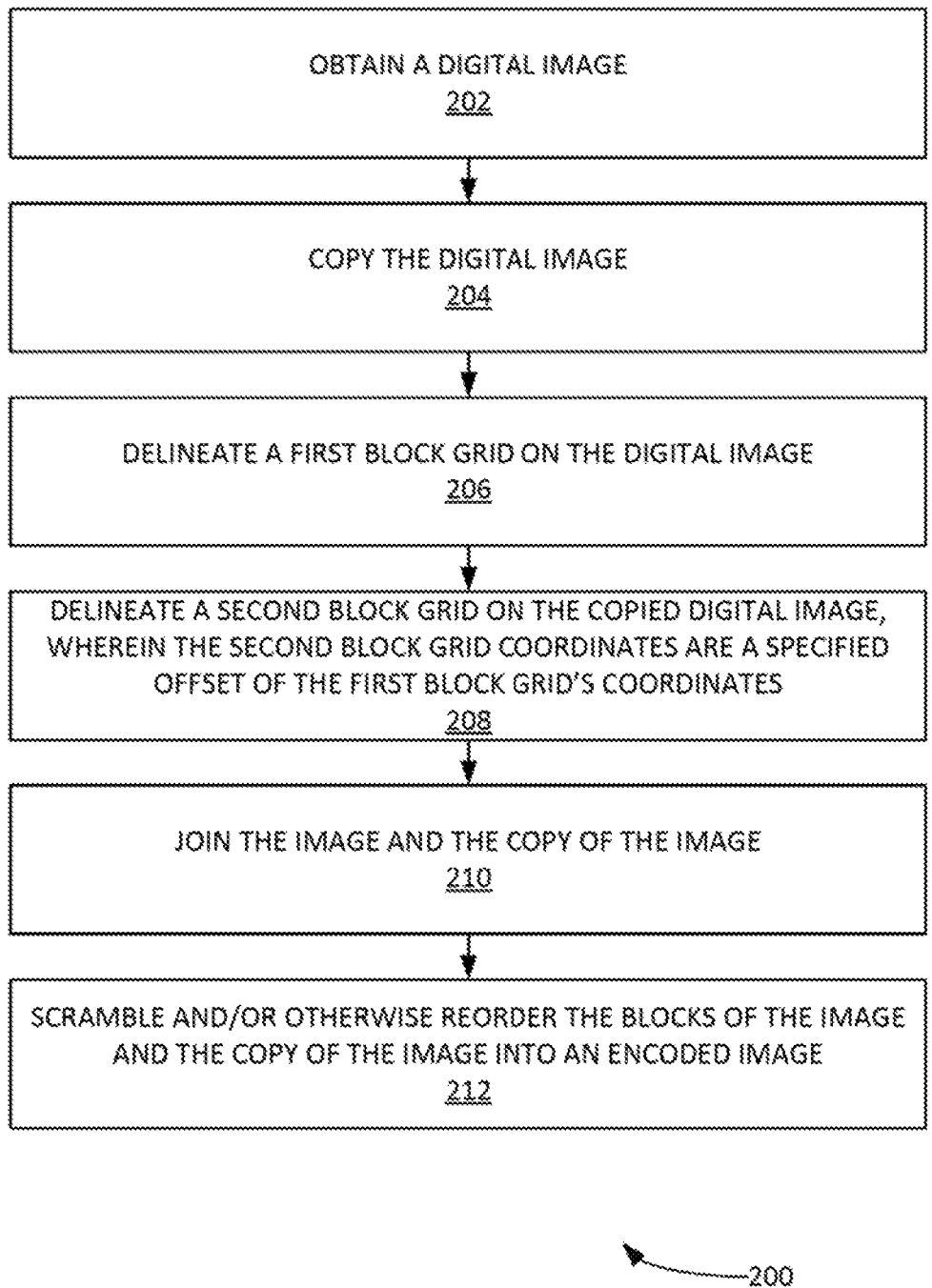
FIG. 2 illustrates an example method for reducing block boundary artifacts when encoding a digital image, according to some embodiments.

FIG. 2 illustrates an example method 200 for reducing block boundary artifacts when encoding a digital image, according to some embodiments. In step 202, process 200 can obtain a digital image. In step 204, process 200 can create a copy the digital image. In step 206, process 200 can delineate a first pixel-box grid on the digital image. A pixel box can be a unit of the digital image to be reordered/scrambled. A box size can be measured by the number of pixels in each boundary. For example, a box can be five by five pixels, ten by ten pixels, etc. Step 206 can begin box delineation at a specified set of coordinates (e.g. (0, 0)) and then, depending on the box size, step 205 delineate the remainder of the box.

In step 208, process 200 can delineate a second pixel-box grid on the copied digital image. The second pixel-box grid coordinates can a specified offset of the first pixel-box grid's coordinates. For example, the specified coordinates for the first image begin at coordinate (0, 0) and the box size is ten by ten (10×10) pixels. The offset for the second box can be offset half the length of the boundary of the first image's boxes. For example, the delineation of the copied images boxes can be at coordinate (5, 5) and the box size can be ten by ten (10×10) pixels. In some example embodiments, the first copy image can then be placed in a single double digital image with the second copy image.

In step 210, process 100 join the original digital image and the copy of the digital image. The boxes of the two digital images can be offset. In step 212, process 200 can scramble and/or otherwise reorder the boxes of the image and the copy of the image into an encoded image the two digital images. For example, the boxes of the two digital images can be scrambled together into a single scrambled and/or otherwise encoded digital images.

Figure 3:
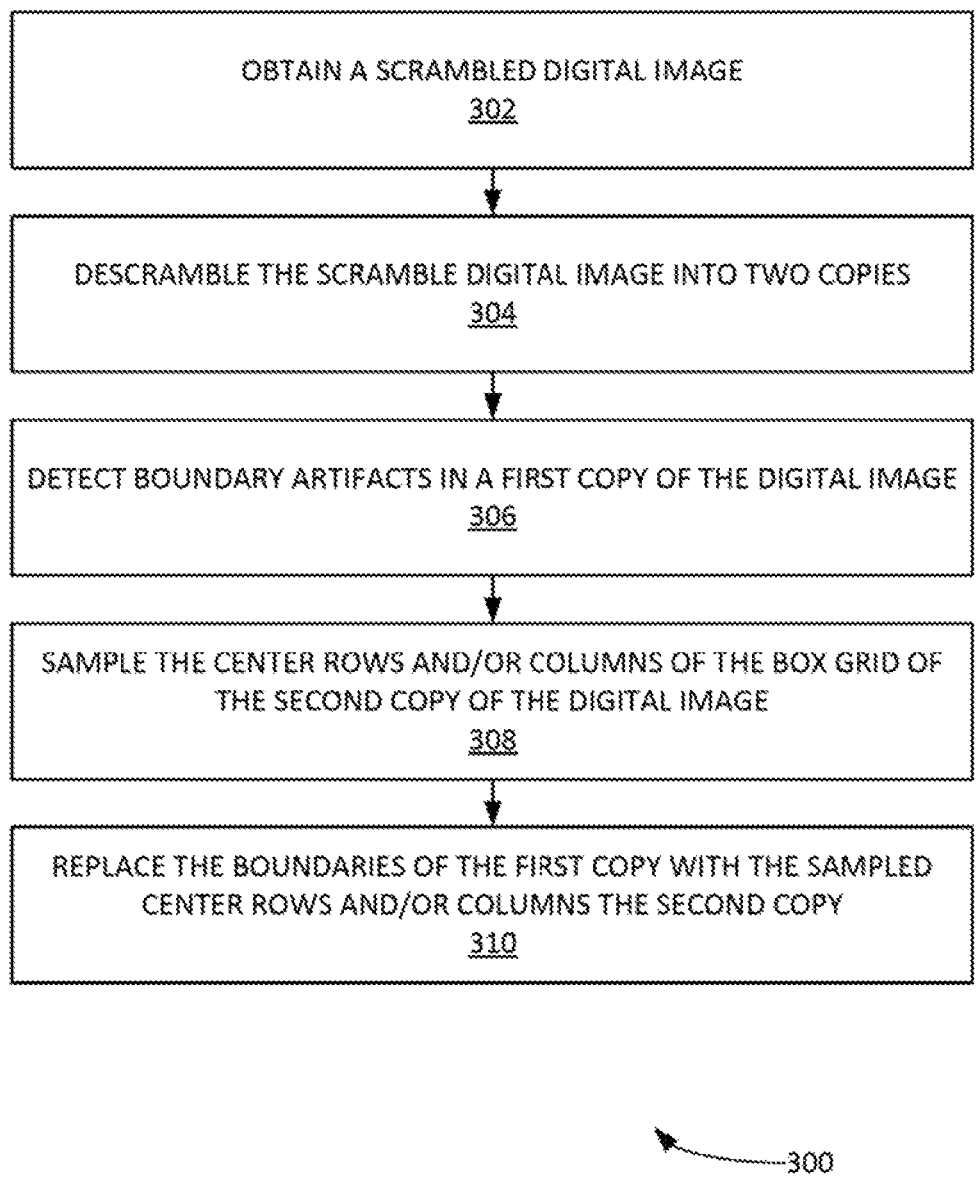
FIG. 3 illustrates an example process for descrambling a digital image scramble using process, according to some embodiments.

FIG. 3 illustrates an example process 300 for descrambling a digital image scramble using process 200, according to some embodiments. In step 302, process 300 can obtain a scrambled digital image. In step 304, process 300 can descramble the scramble digital image into two copies. In step 306, process 300 can detect boundary artifacts in a first copy of the digital image. For example, the grid of FIG. 1 can be apparent in the descrambled digital image. In step 308, process 300 can sample the center rows and/or columns of the box grid of the second copy of the digital image. For example, process 300 can use a line of pixels of the center of a corresponding box of the second image as a corresponding border of first image. This is become the information that is lost as borders in the first copy of the image is not a border but rather a center of the second copy of the image due to the offset of formatting the boxes of the second copy. In step 310, process 300 can replace the boundaries of the first copy with the sampled-center rows and/or columns the second copy. It is noted that noise reduction and/or other algorithms can be implemented to further reduce the remaining distortion in the descrambled image (e.g. the four corner pixels of the boundary of line, etc.). Using processes 200-300, an original image can be reduced in size, scrambled and then descramble and brought back to original size with less error.

Figure 4:
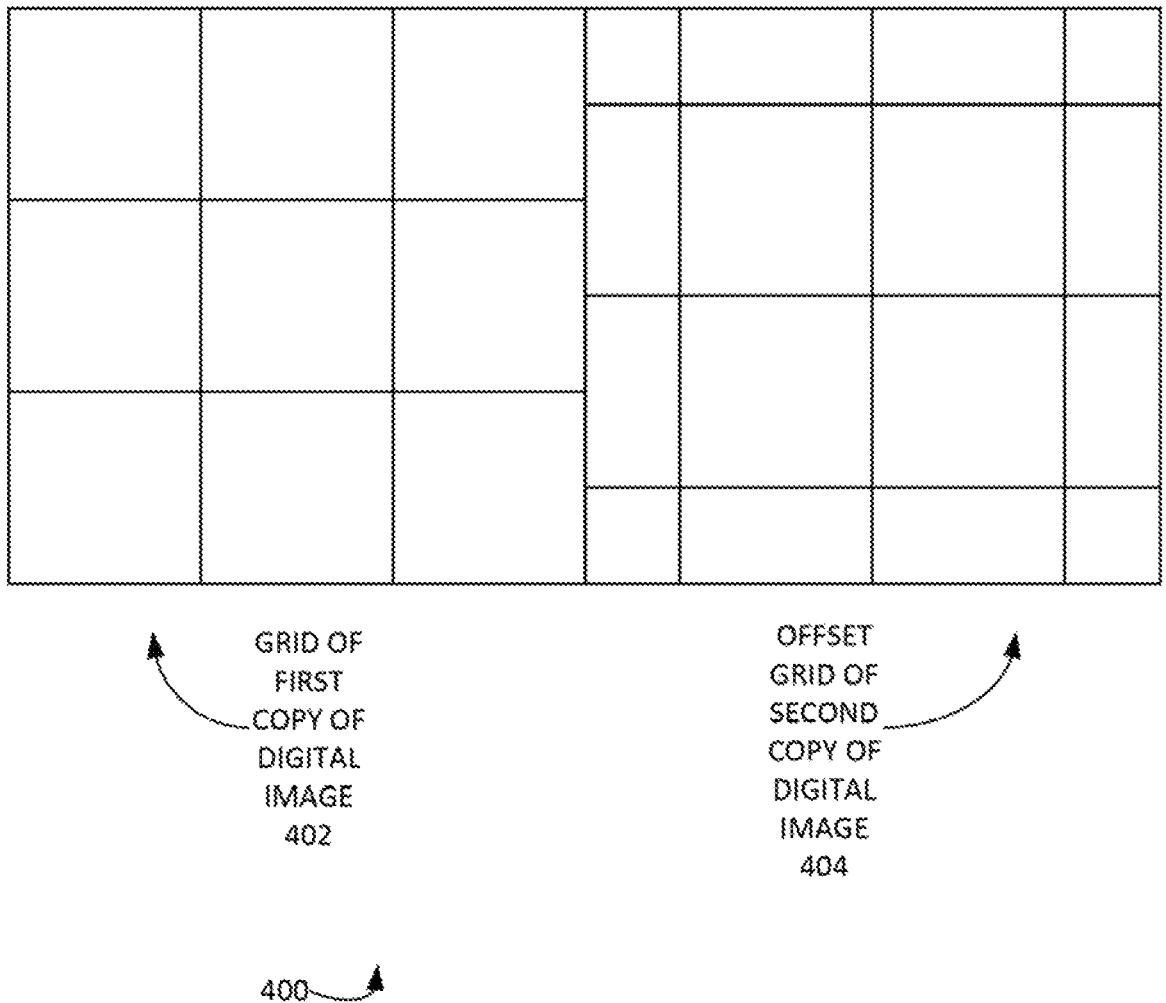
FIG. 4 illustrates an example pair of copies of a single image to be scrambled, according to some embodiments.

FIG. 4 illustrates an example pair of copies 400 of a single image to be scrambled, according to some embodiments. Area 402 is a grid of a first copy of the digital image. Area 404 is an offset grid of second copy of digital image. The boxes of both copies can be scrambled together into a single encoded image. In some examples, the partial border boxes of the second copy can be combined together such that all the boxes are of equal size before a scrambling process.

Figure 5:
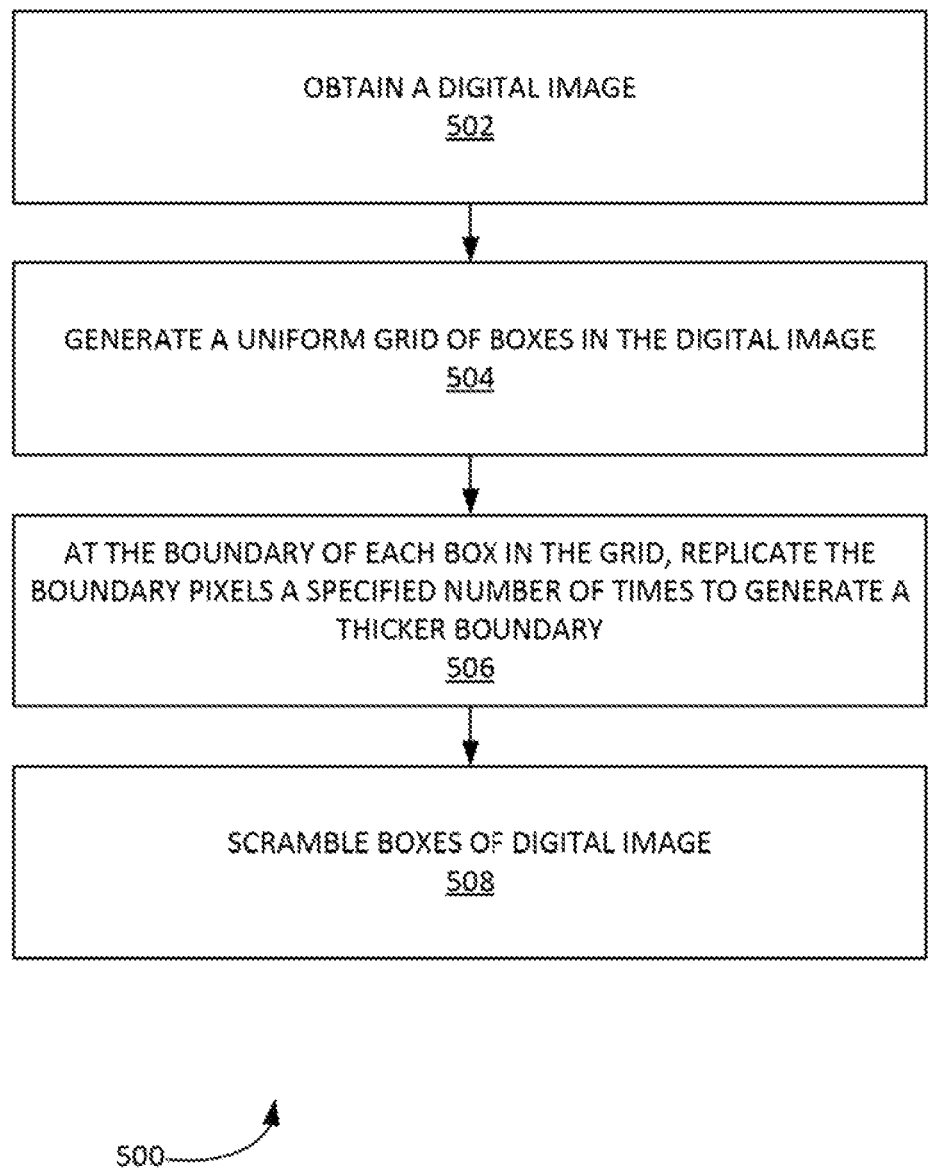
FIG. 5 a process of scrambling a digital image, according to some embodiments.

FIG. 5 a process 500 of scrambling a digital image, according to some embodiments. In step 502, process 500 can obtain a digital image. In step 504, process 500 can generate a uniform grid of boxes in the digital image. In step 506, process 500 can, at the boundary of each box in the grid, replicate the boundary pixels a specified number of times to generate a thicker boundary. In step 508, process 500 can scramble boxes of digital image. It is noted that the frame of a box can be a duplication of pixels of the border of the box. For example, the border of the box can be one-pixel of thickness. The frame can be the one-pixel of thickness copied to a four (or other number) pixel-depth of thickness. This can provide a 'safety' frame that may withstand the later distortions (e.g. compression, resizing, encoding, etc.) of the image. If when the digital image is later descrambled and the boundary artifact is detected, then the other processes can be utilized to remove the boundary artifacts.

It is noted that scrambling can be a process of randomly mixing up a sampled-set of pixel boxes in some example embodiments, the pixel boxes can be non-randomly sorted using a set order as determined by various attributes of the original digital image. For example, instead of a random selection (e.g. as determined by a pseudo-random number generation process, etc.) an ordered selection of pixel-boxes sorted can be based on taking an average value of each channel and then resort on three (3) planes (e.g. luminance, chrominance, etc.).

Exemplary Computer Architecture and Systems

Figure 6:
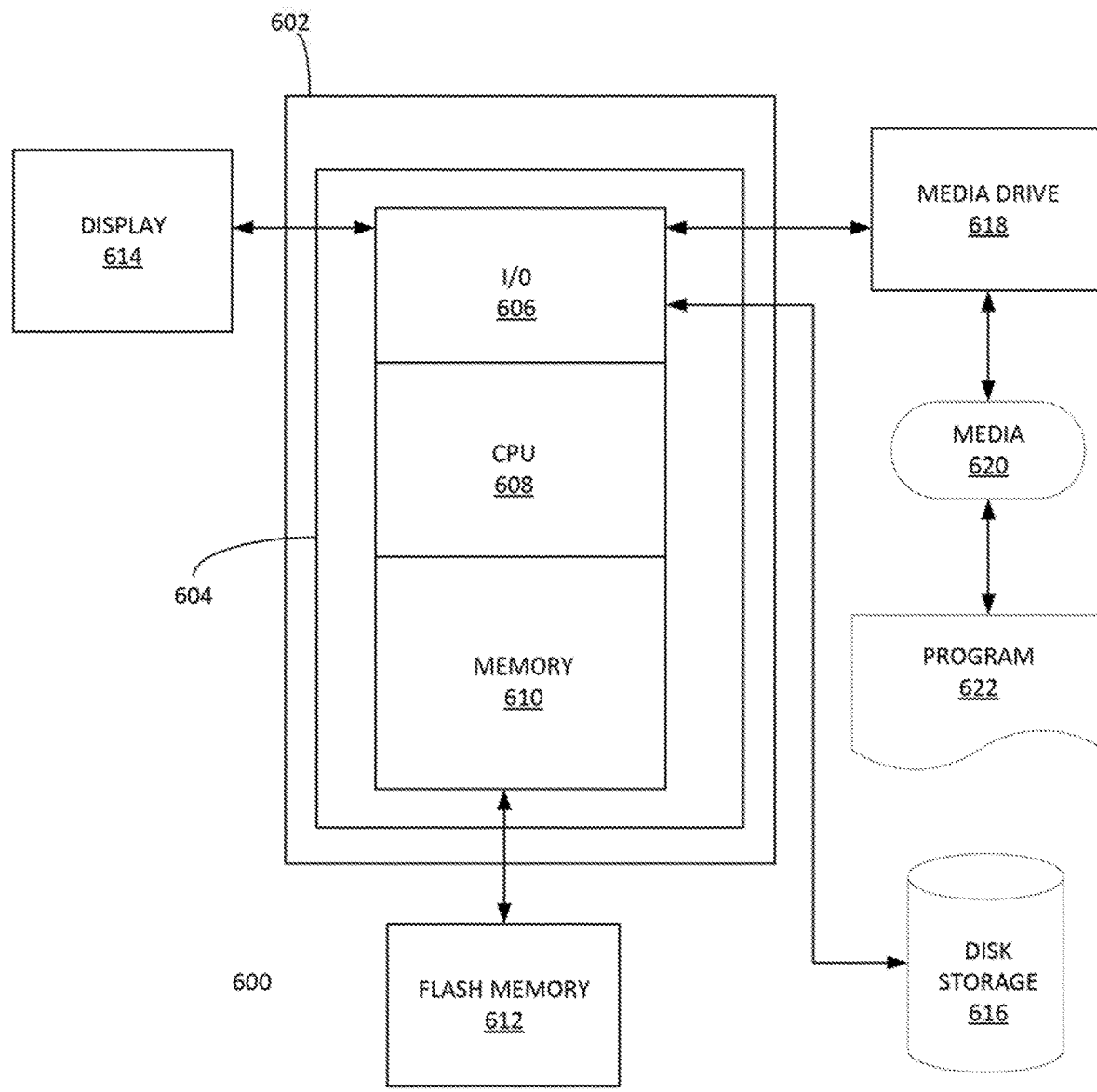
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing stem 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 7:
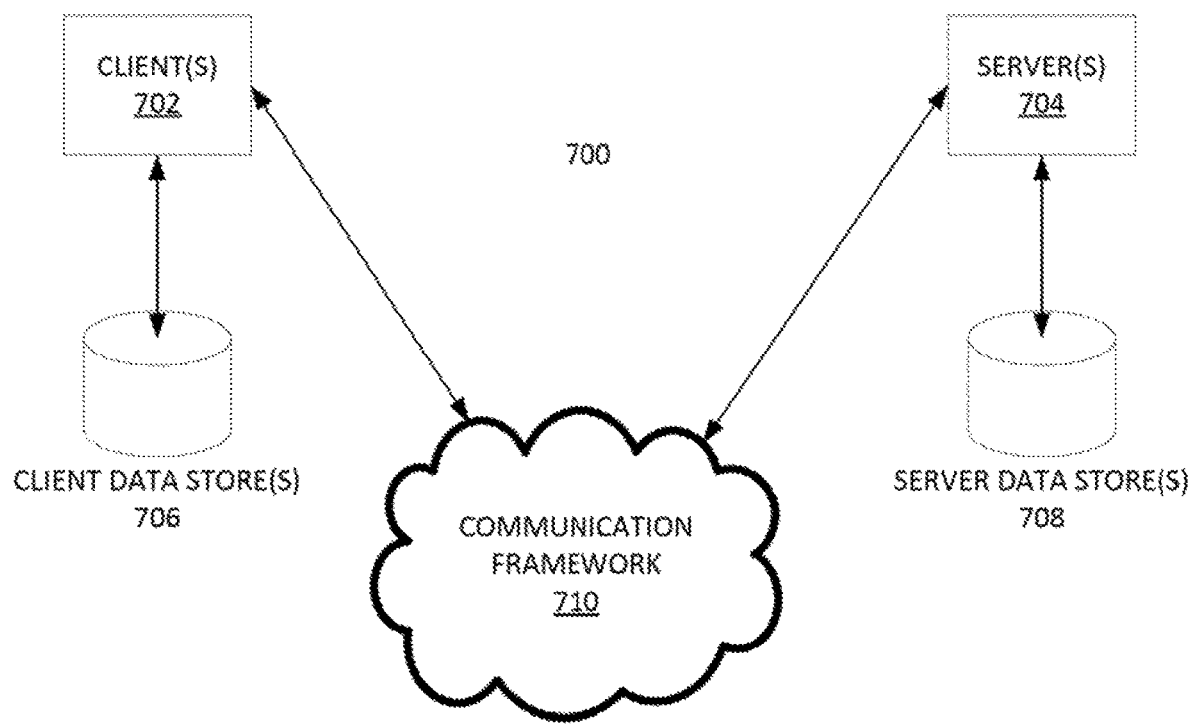
FIG. 7 is a block diagram of a sample computing environment that can be utilized to implement various embodiments.

FIG. 7 is a block diagram of a sample computing environment 700 that can be utilized to implement various embodiments. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 710 that can be employed to facilitate communications between the client(s) 702 and the server(s) 704. The client(s) 702 are connected to one or more client data store(s) 706 that can be employed to store information local to the client(s) 702. Similarly, the server(s) 704 are connected to one or more server data store(s) 708 that can be employed to store information local to the server(s) 704. In some embodiments, system 700 can instead be a collection of remote computing services constituting, a cloud-computing platform.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method useful for reducing block boundary artifacts in a digital image processing comprising:
   obtaining an original digital image to be scrambled;
   creating a copy of the digital image;
   delineating a first pixel-box grid on the digital image;
   delineating a second pixel-box grid on the copy of the digital image;
   joining the original digital image and the copy of the digital image, wherein the first pixel-box grid of the original digital image and of the second pixel-box grid are offset by a specified number of pixels; and
   scrambling the first pixel-box grid of the original digital image and of the second pixel-box grid of the copy of the digital image into an encoded digital image.

2. The computerized method of claim 1, wherein a pixel box of the first pixel-box grid comprises a unit of the original digital image to be scrambled.

3. The computerized method of claim 2, wherein the pixel-box is measured by a number of pixels in each boundary of the pixel-box.

4. The computerized method of claim 3, wherein the number of pixels in each boundary of the pixel-box comprises five pixels.

5. The computerized method of claim 4, wherein box delineation begins at a specified set of pixel coordinates.

6. The computerized method of claim 5, wherein a second pixel-box grid coordinates is set at a specified offset from the first pixel-box grid's coordinates.

7. A computer system useful for reducing block boundary artifacts in a digital image processing comprising:
   a processor;
   a memory containing instructions when executed on the processor, causes the processor to perform operations that:
   obtain an original digital image to be scrambled;
   create a copy of the digital image;
   delineate a first pixel-box grid on the digital image;
   delineate a second pixel-box grid on the copy of the digital image;
   join the original digital image and the copy of the digital image, wherein the first pixel-box grid of the original digital image and of the second pixel-box grid are offset by a specified number of pixels; and
   scramble the first pixel-box grid of the original digital image and of the second pixel-box grid of the copy of the digital image into an encoded digital image.

8. The computerized system of claim 7, wherein a pixel box of the first pixel-box grid comprises a unit of the original digital image to be scrambled.

9. The computerized system of claim 8, wherein the pixel-box is measured by a number of pixels in each boundary of the pixel-box.

10. The computerized system of claim 9, wherein the number of pixels in each boundary of the pixel-box comprises five pixels.

11. The computerized system of claim 10, wherein box delineation begins at a specified set of pixel coordinates.

12. The computerized system of claim 11, wherein a second pixel-box grid coordinates is set at a specified offset from the first pixel-box grid's coordinates.

* * * * *